April 24, 1934.   J. H. MACARTNEY ET AL   1,955,755
ENGINE
Filed May 9, 1932   6 Sheets-Sheet 1

INVENTORS;
JOHN H. MACARTNEY
ROBERT S. STARK.
BY Victor J. Evans & Co
ATTORNEYS

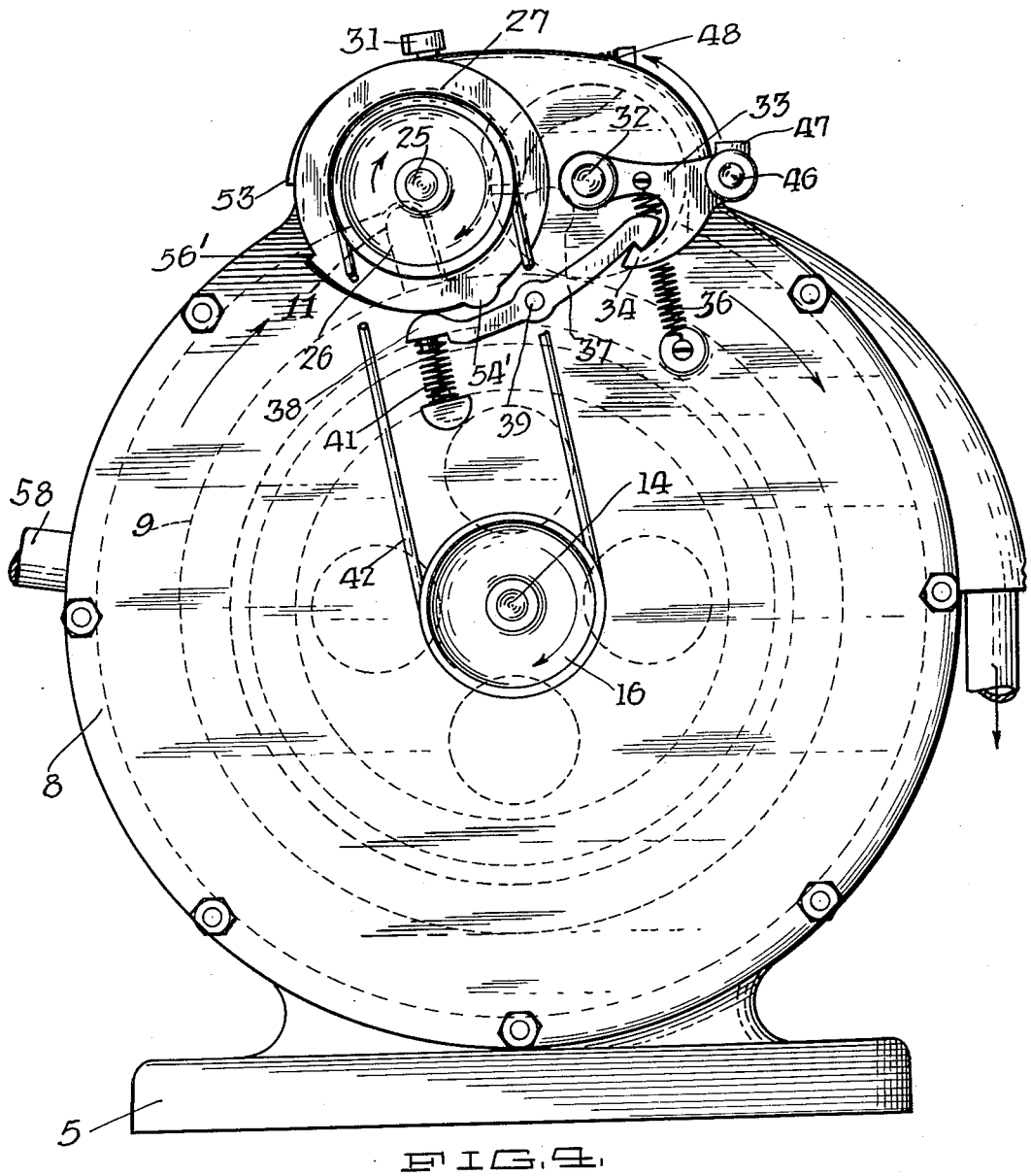

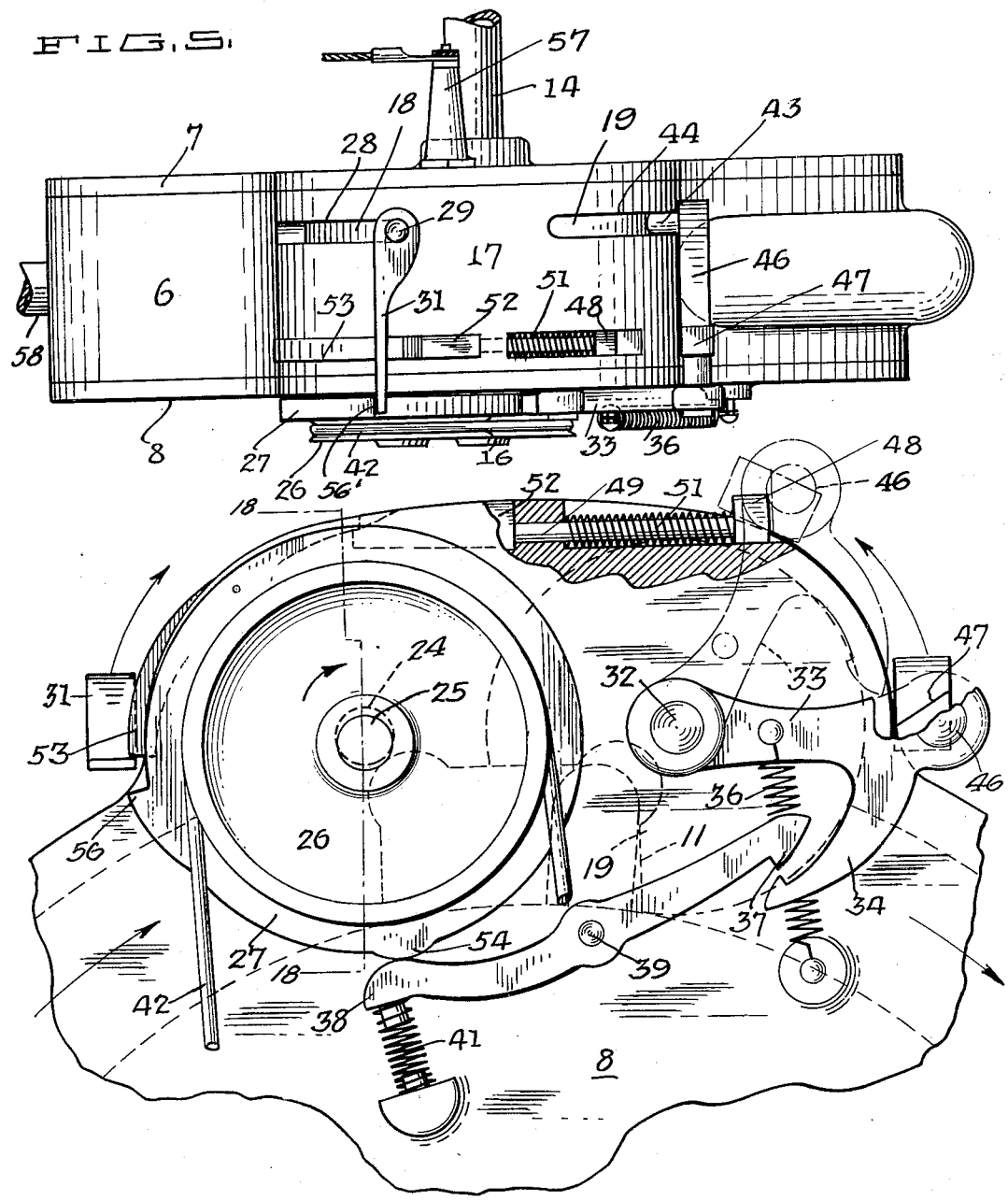

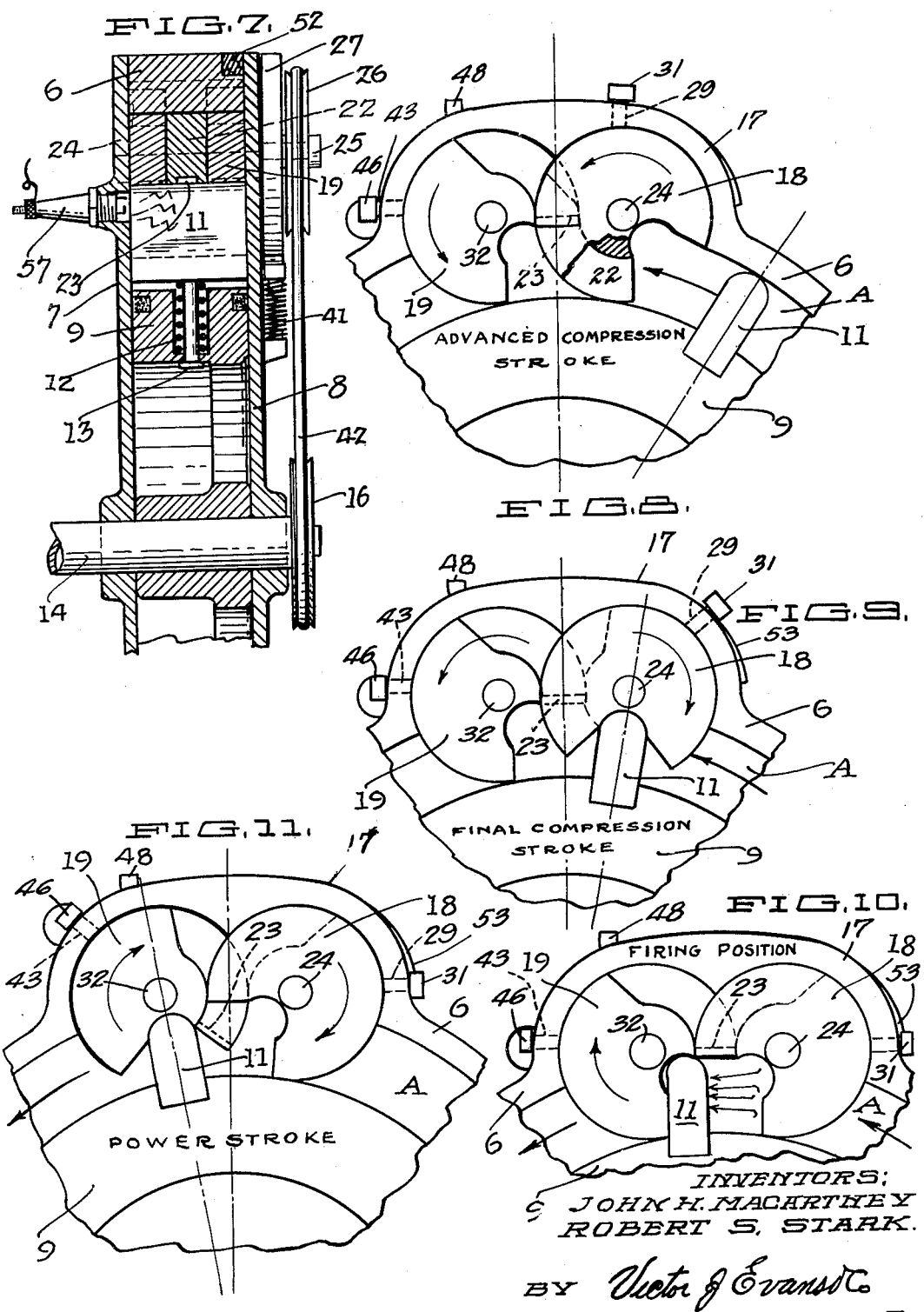

April 24, 1934. J. H. MACARTNEY ET AL 1,955,755
ENGINE
Filed May 9, 1932 6 Sheets-Sheet 5

INVENTORS:
JOHN H. MACARTNEY
ROBERT S. STARK.
BY Victor J. Evans & Co.
ATTORNEYS.

April 24, 1934.  J. H. MACARTNEY ET AL  1,955,755
ENGINE
Filed May 9, 1932  6 Sheets-Sheet 6

John H. Macartney
Robert S. Stark
INVENTORS

BY Victor J. Evans & Co.
ATTORNEYS

Patented Apr. 24, 1934

1,955,755

UNITED STATES PATENT OFFICE 1,955,755

ENGINE

John H. Macartney and Robert S. Stark, San Francisco, Calif.

Application May 9, 1932, Serial No. 610,162

3 Claims. (Cl. 123—15)

This invention relates to improvements in engines and has particular reference to an internal combustion engine.

The principal object of the invention is to provide a rotary type engine which is driven through the effect of explosive impulses.

A further object is to produce a device which will eliminate the inefficient stopping and starting of heavy parts as is common in reciprocating engines.

A still further object is to produce a device which is economical to manufacture.

Other objects and advantages will be apparent during the course of the following description.

Figure 1:
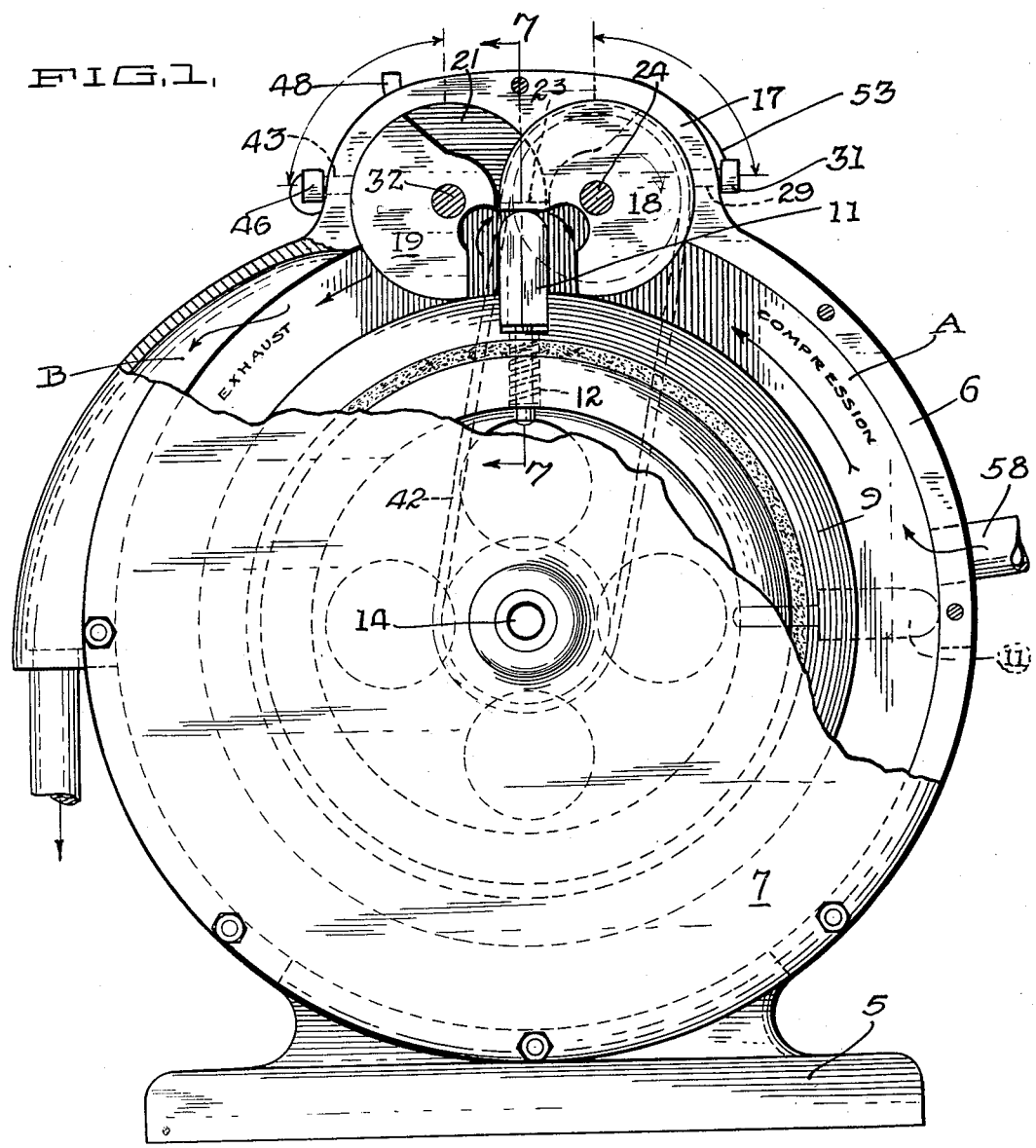
Figure 2:
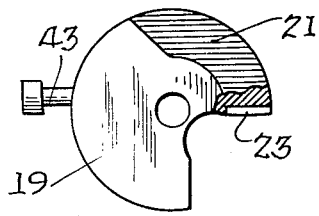
Figure 3:
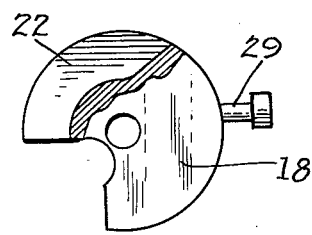
Figure 12:
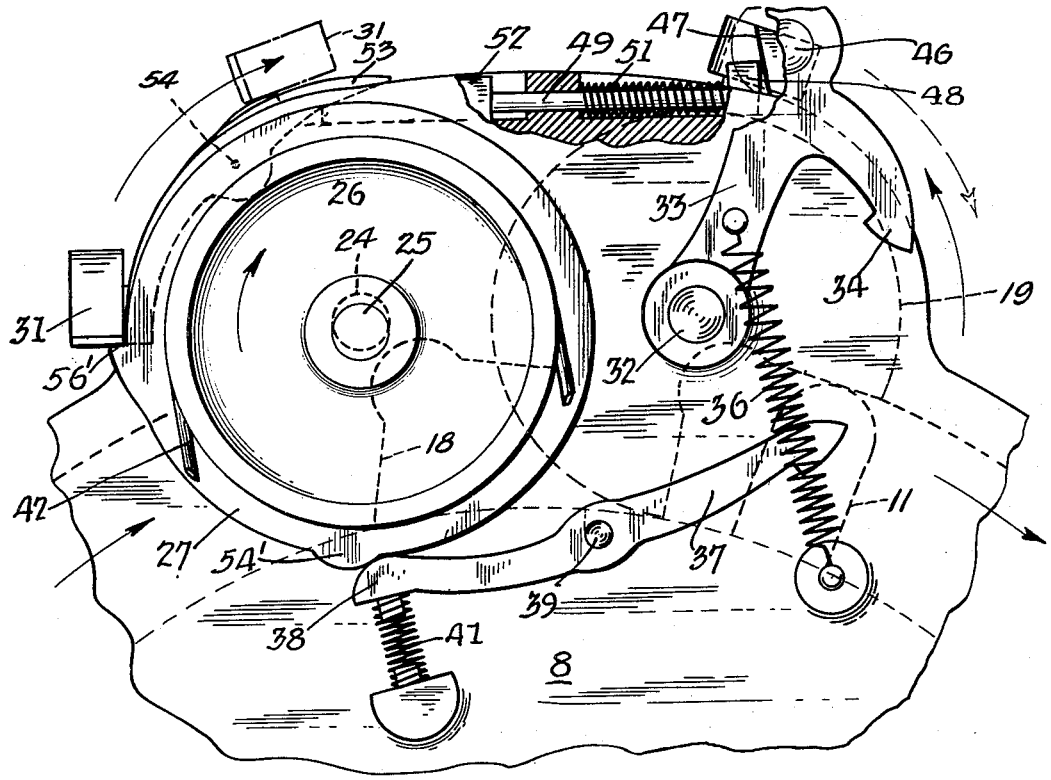
Figure 13:
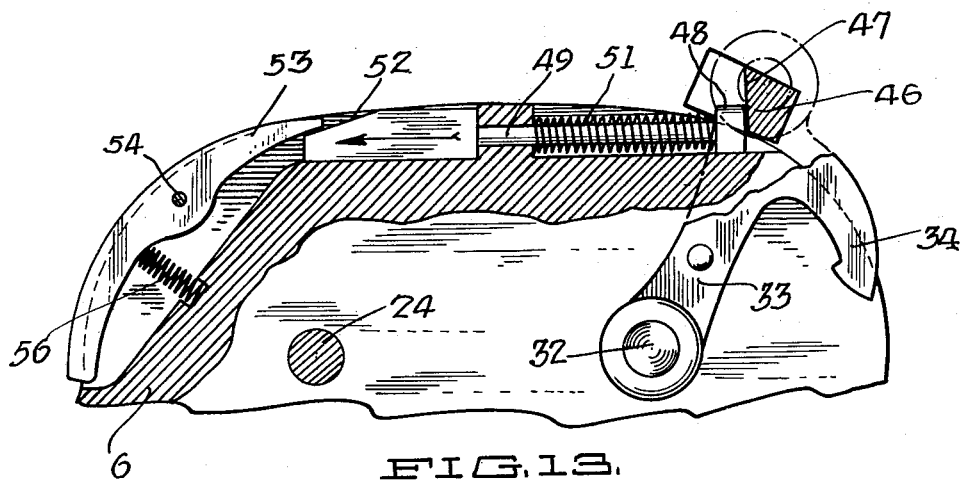
Figure 14:
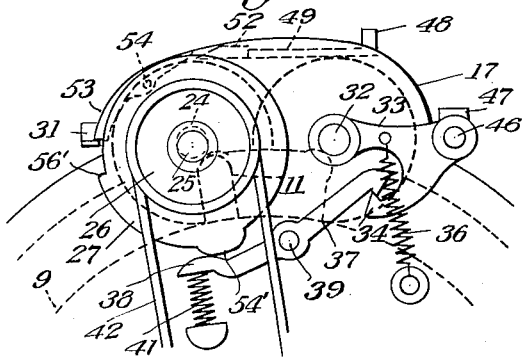
Figure 15:
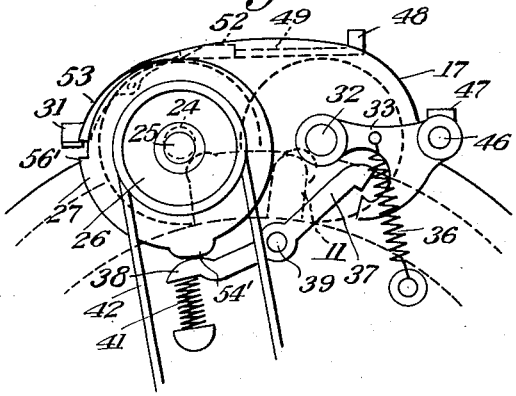
Figure 16:
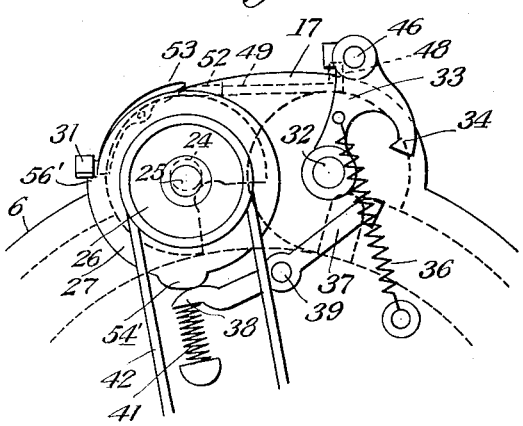
Figure 17:
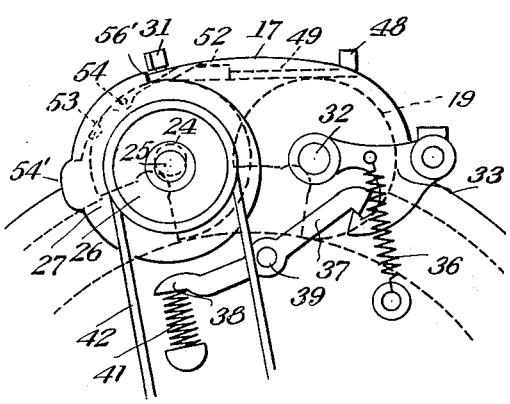
Figure 18:
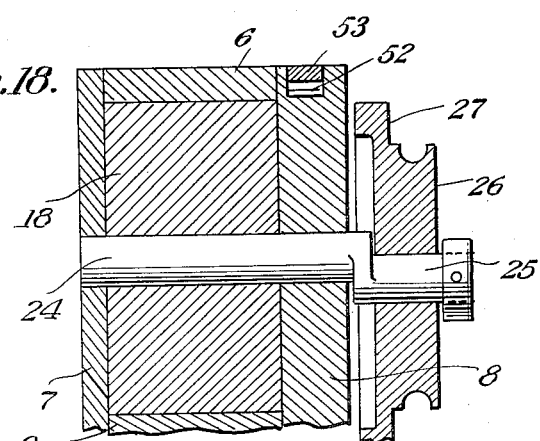

In the accompanying drawings forming a part of this specification and in which like numerals are employed to designate like parts throughout the same, Fig. 1 is a side elevation of our engine having a portion thereof broken away to show the interior mechanism, Figs. 2 and 3 are side elevations partly in cross section of the oscillatory abutments, Fig. 4 is a rear elevation showing the abutment actuating and latching mechanism, Fig. 5 is a top plan view of Fig. 4, Fig. 6 is an enlarged fragmentary detail view showing the arrangement of the abutment actuating and latching mechanism, when the abutments are in firing position, Fig. 7 is a cross sectional view taken on the line 7—7 of Fig. 1, Figs. 8, 9, 10 and 11 are diagrammatic views showing the cycles of operation of the abutments from compression to power stroke, Fig. 12 is a view similar to Fig. 6, showing the parts in the position at the beginning of the power stroke, Fig. 13 is a fragmentary cross sectional view showing the manner in which the abutment release catch is actuated, Fig. 14 is a diagrammatic view showing the approximate position of the parts, including the abutment actuating and latching mechanism, just after the vane has entered the firing chamber and prior to the time the firing takes place, Fig. 15 is a similar view showing the approximate position of the parts at the time the firing takes place, Fig. 16 is a similar view showing the approximate position of the parts directly after the firing has taken place, Fig. 17 is a similar view showing the normal position of the parts, or the arrangement thereof, on the exhaust and compression stroke of the vane, Fig. 18 is a sectional view taken approximately on line 18—18 of Fig. 6.

In the accompanying drawings wherein for the purpose of illustration is shown a preferred embodiment of our invention, the numeral 5 designates a base upon which is positioned a casing 6, having side plates 7 and 8, thus forming a circular chamber within which is positioned a rotor 9 having a vane 11 slidably mounted in the periphery thereof, and held against the action of centrifugal force by an expansion spring 12 surrounding a pin 13 secured to the vane 11. The rotor 9 is secured to a shaft 14 upon one end of which is mounted a pulley 16. An offset portion 17, formed in the casing, serves to house an intake oscillatory abutment 18 and an exhaust oscillatory abutment 19. These abutments are peculiar in shape, as will be noted in Figs. 2 and 3, the abutment 19 having a reduced portion 21 which passes into a recessed portion 22 centrally of the periphery of the abutment 18. The abutment 19 has a by-pass 23, the purpose of which will be later seen. The abutment 18 is mounted upon a shaft 24. A pulley 26 is mounted upon a shaft 25 which is formed on and arranged eccentrically with respect to the shaft 24 as clearly shown in Fig. 18, and the purpose of the eccentric mounting will be later seen. A cam wheel 27 is formed on the pulley 26 and extends from the inner side thereof and outwardly beyond its periphery. A slot 28 is formed in the offset portion 17 so that a pin 29 attached to the abutment 18 may extend therethrough, and the pin has rigidly attached thereto, an arm 31, the purpose of which will be later seen.

The abutment 19 is mounted upon a shaft 32 which carries a control arm 33 provided with a hooked extremity 34 and is normally held in retracted position by a spring 36. This hooked extremity 34, when the arm 33 is in retracted position, as best shown in Fig. 4, engages the hooked end of a rocker arm 37 having a nose 38, which rocker arm is fulcrumed as at 39, so that the nose 38 will be in close proximity to the periphery of the cam wheel 27. A spring 41 tends to hold the nose 38 against the cam wheel so that the rocker arm 37 will be actuated thereby. A belt 42 connects the pulley 16 and the pulley 26. The abutment 19 is provided with a pin 43 which extends through an opening or slot 44 in the offset portion 17 and has an arm 46 secured thereto which arm extends through and is rigid with the control arm 33. This arm 46 is provided with a flat surface 47 which is adapted to engage the head 48 of a sliding bolt 49, which bolt is normally held in the position of Fig. 13, by a spring 51. The bolt 49 carries a cam 52, the nose of which underlies one end of an abutment release catch 53 which is fulcrumed as at 54. A spring 56 tends to maintain one end of the catch in a portion to be engaged by the cam 52 and the other end portion raised, as shown in Fig. 6. A cam 54' is provided upon the cam wheel 27 and a projection 56' is also formed upon this cam wheel. A spark plug 57 is mounted in the plate 7 so that a compressed charge between the abutments may be exploded, as will be later seen.

The result of this construction is that when an explosive mixture is forced through the intake pipe 58 into the compression chamber A, this explosive mixture will be compressed by the vane 11 in travelling from a point adjacent the intake pipe to the exhaust abutment. During the compression stroke the abutments will be in the position shown in Fig. 8, which permits the gas being compressed to pass through the space 22 of the abutment 18, and against the abutment 19 when it is compressed. This abutment 19 is held against oscillation, at this time, through the fact that the latching mechanism is in latched position, as best shown in Fig. 4. That is the hooked end of the rocker arm 37 will be engaged with the hooked extremity 34 of the control arm 33 which is rigidly attached to the arm 46, and the latter is fixed to the pin 43 of the abutment 19. Continued movement of the rotor causes the vane to come into contact with the abutment 18 and to move the same to the position illustrated in Fig. 9. During this rotation the pin 29 and arm 31 will be moved simultaneously with the movement of the abutment 18 and until the arm 31 passes beneath the abutment release catch 53, at which time the abutment 18 becomes locked, as clearly shown in Figs. 6, 14 and 15. By this time the vane has reached the abutment 19, as shown in Figs. 10 and 15, and the compressed gas in front of the vane has moved over to the back of the vane through the by-pass 23 as illustrated in arrows in Fig. 1, within the firing chamber and at this time the spark plug 57 fires the compressed gas. At the same instance the cam 54' has released the control arm 33 for releasing the abutment 19 accordingly, by actuating the rocker arm 37, as shown in Fig. 16. As the explosion takes place, the vane 11 passes from the position of Fig. 10 to the position of Fig. 11, and in rotating the abutment 19 which has been released as above set forth the pin 43, arm 46 and flat surface 47, are raised together with the control arm 33 and against the tension of the spring 36. This causes the flat surface 47 to engage the head 48 of the bolt 49 and to thus move the nose of the cam 52 under the abutment release catch 53 so as to release the arm 31 from locked position. This occurs just at the time that the projection 56' engages with the end of the arm 31, and as before mentioned, the shaft 25 which carries the cam wheel 27, is eccentrically mounted with respect to the shaft 24, consequently this projection 56' which is constantly rotating through the action of the belt 42, will raise the arm 31 and carry the abutment 18 back to its normal position as clearly shown in Figs. 8 and 17.

During this carrying back operation, the projection 56' of the cam wheel 27 is gradually moving out of engagement with the arm 31 due to the eccentric mounting of the shaft 25 so that when the arm 31 has reached its normal position as clearly shown in Figs. 5 and 17 the projection 56' will be out of engagement therewith. As soon as the vane 11 has passed the abutment 19, the abutment will be returned to its normal position as best shown in Fig. 1, through the action of the spring 36, as before mentioned, and thus shut off any possibility of an escape of the exhaust in a backward direction, and therefore the exhaust will necessarily leave through the exhaust chamber B. Thus it will be seen that during the cycles of operation, compression takes place then expansion thence firing occurs, after which exhaust and that during the four cycles, the abutments pass through the stages illustrated in Figs. 8 to 11 inclusive, while the abutment actuating and releasing mechanism assumes the positions shown in Figs. 14 to 17 inclusive. During these stages the abutments are locked and released at proper intervals so that there is no possibility of gas or explosive force being exerted in a wrong direction.

It is to be understood that the form of our invention herewith shown and described is to be taken as a preferred example of the same and that various changes relative to the material, size, shape and arrangement of parts may be resorted to without departing from the spirit of the invention or the scope of the subjoined claims.

Having thus described our invention, we claim:—

1. In a rotary engine, a casing, a rotor positioned in said casing, a vane carried by said rotor and extending from its periphery, a pair of abutments mounted for oscillation in said casing and each having a portion thereof removed to receive the vane and allow for the passage thereof with respect to the abutments, means including the vane for oscillating said abutments, means for latching and holding said abutments stationary and releasing means for said abutments.

2. In a rotary engine, a casing, a rotor rotatably mounted in said casing, a vane slidably mounted in said rotor and extending from the periphery thereof, a pair of abutments mounted for oscillation in said casing, a portion of each of said abutments overlapping each other, each of said abutments having a portion thereof cutaway to receive the vane and to allow for the passage thereof with respect to the abutments, said vane being engageable with the abutments for moving the latter about their axis one of said abutments being provided with a by-pass, said abutments being capable of forming an explosion chamber, explosive means communicating with said chamber, means for latching and holding each of said abutments during a portion of the cycles of operation of the engine, means actuated by said rotor for releasing said abutments after an explosion has taken place and means for returning said abutments to normal position.

3. In a device of the character described, a casing, a rotor rotatably mounted in said casing, a vane slidably positioned on the periphery of said rotor, a pair of oscillatory abutments mounted in said casing, a portion of each of said abutments overlapping each other, each of said abutments having a portion thereof cut away, whereby said vane may enter said cut-away portions to allow for the passage thereof with respect to the abutments and for the purpose of moving said abutments about their axis, one of said abutments being provided with a by-pass, said abutments being capable of forming an explosion chamber, explosive means communicating with said chamber, means for locking each of said abutments during a pre-determined portion of the cycles of operation, said locking means including a latch for each of said abutments, a cam mechanism for unlocking each of said latches and means for returning said abutments to their normal position.

JOHN H. MACARTNEY.
ROBERT S. STARK.